P. S. DUNN.
LOCK.
APPLICATION FILED APR. 25, 1908.
925,761.
Patented June 22, 1909.
3 SHEETS—SHEET 1.
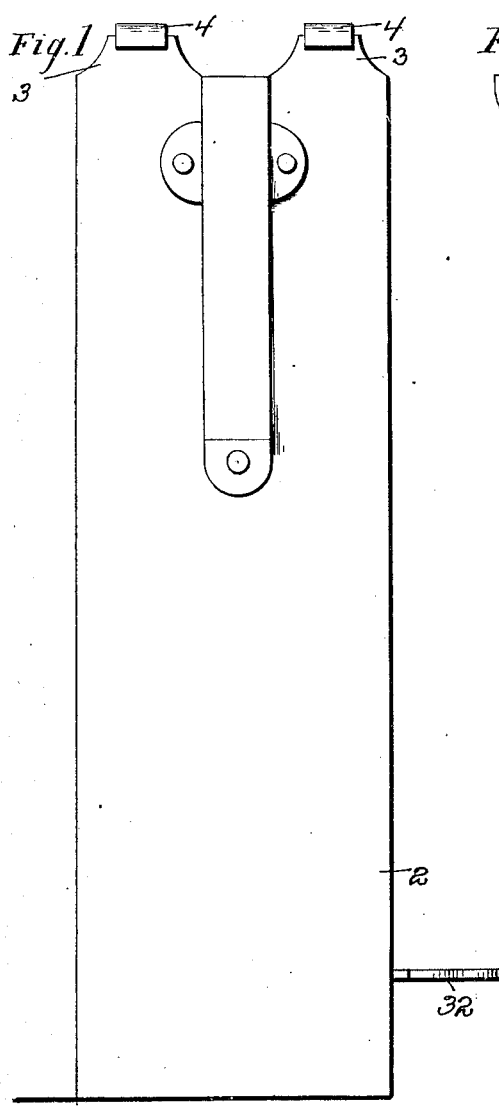
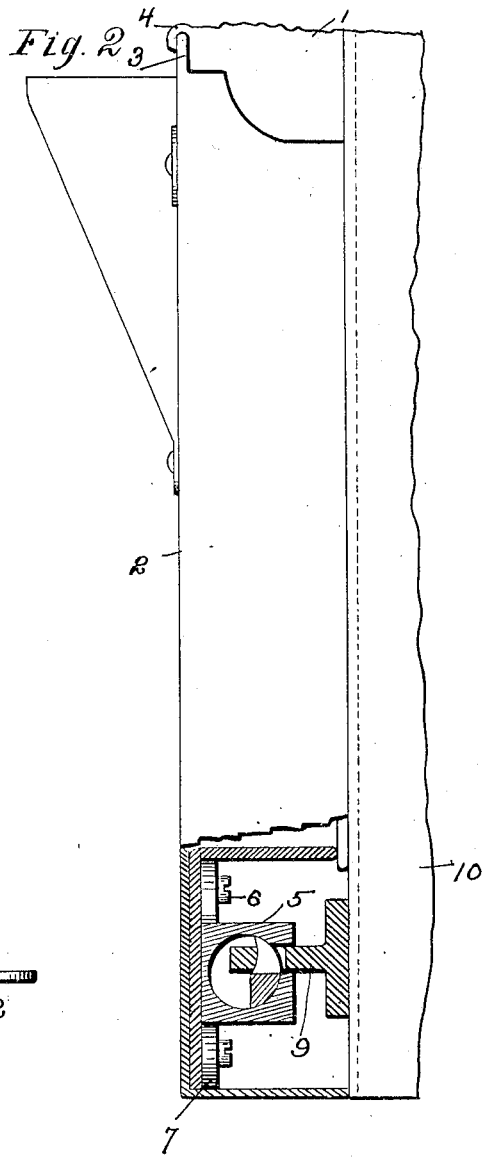

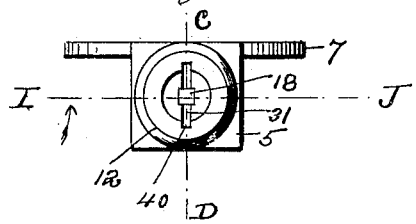
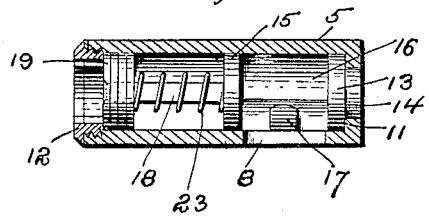
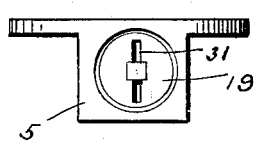
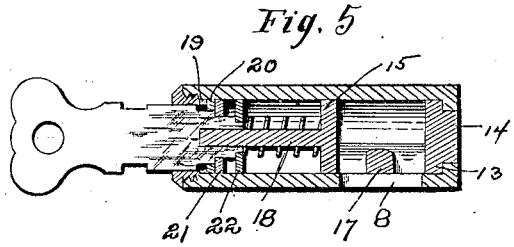
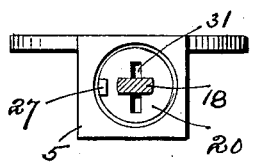
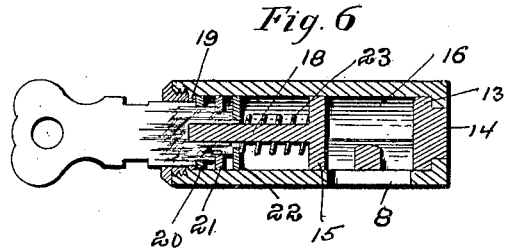
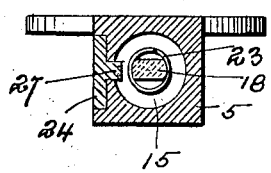
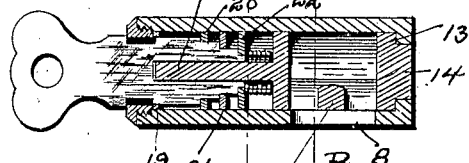
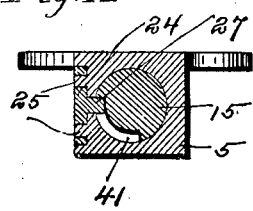

P. S. DUNN.
LOCK.
APPLICATION FILED APR. 25, 1908.

925,761.

Patented June 22, 1909.
3 SHEETS—SHEET 3.

WITNESSES
Florence N Monk
Gertrude Bethauer

INVENTOR
Peter S. Dunn
BY
George Hall
ATTORNEY

UNITED STATES PATENT OFFICE.

PETER S. DUNN, OF NEW HAVEN, CONNECTICUT, ASSIGNOR OF ONE-THIRD TO THOMAS F. FITZSIMMONS AND ONE-THIRD TO DAVID E. FITZ GERALD, OF NEW HAVEN, CONNECTICUT.

LOCK.

No. 925,761.       Specification of Letters Patent.      Patented June 22, 1909.

Application filed April 25, 1908. Serial No. 429,149.

*To all whom it may concern:*

Be it known that I, PETER S. DUNN, a citizen of the United States, residing at New Haven, in the county of New Haven and State of Connecticut, have invented certain new and useful Improvements in Locks, of which the following is a specification, reference being had therein to the accompanying drawings.

My invention relates to new and useful improvements in locks, or fastening devices, in which the bolt is adapted to rotary movement or is vibrated from an axial center of motion.

It has for its object, among other things, to provide a lock in which the axis of motion of the key is coincident with that of the locking bolt and whereby the longitudinal movement of the key in insertion is employed to set or initially arrange a series of tumblers in unlocking position against the counter force of a spring, preliminary to the final rotary unlocking movement of the key and bolt.

The improvement is particularly applicable for use in connection with prepaid gas meters and other money collecting machines, but is not limited to such use.

To these, and other ends, my invention consists in the lock having certain details of construction and combinations of parts as will be hereinafter described and more particularly pointed out in the claims.

Figure 12:
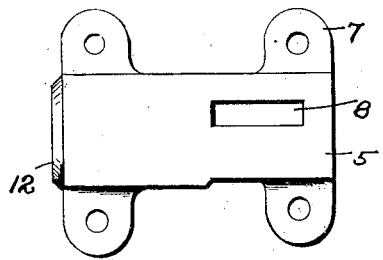
Figure 13:
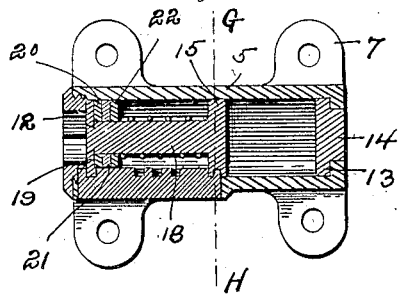
Figure 16:
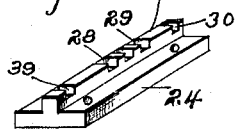
Figure 17:
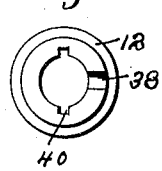
Figure 14:
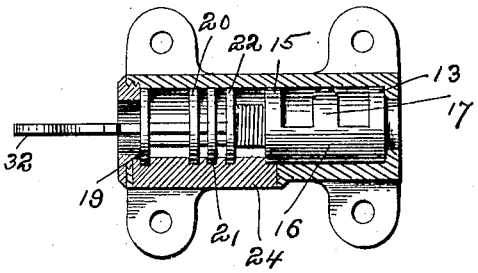
Figure 18:
Figures 19, 20, 21:
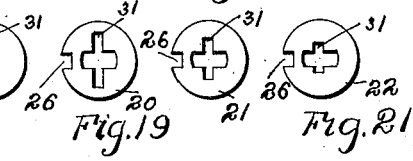
Figure 22:
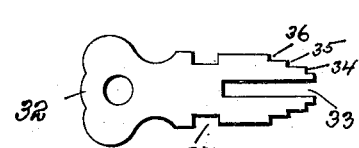
Figure 15:
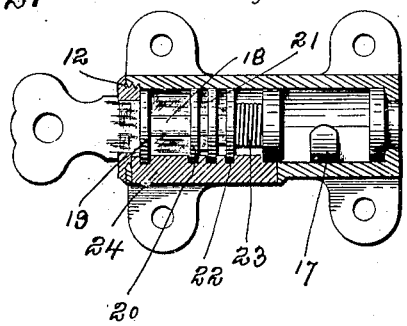

Referring to the accompanying drawings, in which like numerals of reference designate like parts in the several figures; Figure 1 is a front elevation of the money receptacle of a prepaid gas meter; Fig. 2 is a fragmentary side elevation thereof with the lock in cross section on line A—B of Fig. 7; Fig. 3 is an end elevation of my improved lock; Fig. 4 is a section thereof upon line C—D of Fig. 3; Figs. 5, 6 and 7 are similar sections showing the key in the successive positions of its initial operation; Fig. 8 is an end elevation with the cap removed; Fig. 9 is a similar elevation with the spindle in cross section back of the end disk thereof and exposing the next adjacent movable tumbler; Fig. 10 is a cross section on line E—F of Fig. 7; Fig. 11 is a cross section on line G—H of Fig. 13; Fig. 12 is a view of the lock from the side wherein the staple enters; Fig. 13 is a section on line I—J of Fig. 3; Fig. 14 is a similar section showing the locking hook in its locked position and the key in position to unlock the locking bolt; Fig. 15 is a similar section showing the locking hook in unlocked position and moved a quarter turn from its position in the preceding figure; Fig. 16 is a perspective view of the guide plate; Fig. 17 is a rear elevation of the end cap; Fig. 18 is an elevation of the end disk; Figs. 19, 20 and 21 are elevations of the tumblers; and Fig. 22 is a view of the key used in my improved lock.

In the drawings I have illustrated one of the many forms of money receptacles to which my device may be applied, this particular form being the money receptacle of a prepayment or coin controlled gas meter and consists of an upper member 1 and a lower member 2 hinged together by the flanges 3 and lips 4. Inclosed within the member 2 is the lock case 5 that is secured by the screws 6 that pass through the lugs 7 and having a slot 8 therein. The lock staple 9 is fastened to the side of the meter 10 and in the operation of swinging the member 2 of the money receptacle toward the meter after engagement of the lips 4 with the flanges 3 the staple enters the slot 8 and is secured therein by the locking bolt as hereinafter described. The particular form or the details of the mechanism of the money receptacle and meter forms no part of my invention and is only here illustrated to show the application of the lock thereto which alone comprises my invention. The lock case 5 has a lengthwise cylindrical bore or chamber therein terminating in an annular shoulder 11 at one end and having a cap 12 threaded into the opposite end. Rotatable within said chamber is the locking bolt constructed with a head 13 having a trunnion 14 thereon which is journaled in the bearing formed by the shoulder 11, a head 15 connected with the head 13 by an integral web 16 having the locking hook or spur 17 thereon, and an axial spindle 18 flattened upon two sides and having a disk 19 permanently secured thereto.

For convenience in assembling, the disk 19 is preferably riveted upon the end of the spindle, as shown in Fig. 13, but the remaining features of the locking bolt are integrally joined or made in a single piece. Slidable upon the spindle between the disk 19 and head 15 are the tumblers 20, 21 and 22, and encircling said spindle between the tumbler 22 and head 15 is a coil spring 23 which exerts its tension between the parts to normally hold the tumblers against each other and the disk 19, as shown in Figs. 4 and 13.
Within an opening in the side of the lock case 5 is a plate 24 having a feather 27 thereon and which is secured to said case by the studs 25 integral therewith. This plate is secured after all of the lock parts are assembled and the feather enters the slot 38 in the rear face of the cap 12 and permanently secures the same against disengagement, either accidental or otherwise. The tumblers 20, 21 and 22 are formed with notches 26 which engage the feather 27 and are thereby held against premature rotation. The feather 27, however, is also provided with the notches 28, 29 and 30, through which the tumblers may be rotated when brought into alinement therewith, as hereinafter described, and a notch 39 to receive the disk 19, as shown in Figs. 13 to 15, inclusive. The disk 19 and all of the tumblers have diametrical slots 31 therethrough extending in opposite directions from the center thereof, the slot in the disk 19 extending nearly to the circumference thereof, the slot in the tumbler 20 being of less length than that in the disk, the slot in the tumbler 21 being still shorter, and the slot in the tumbler 22 being the shortest of them all. In brief the slots are progressively shorter in length toward the head 15 on the locking bolt.

The key 32 for operating my lock is preferably made of flat metal having a slot 33 in the end thereof of substantially the same width as the distance between the flat sides of the spindle 18 and provided with steps 34, 35 and 36 and notches 37 upon the opposite sides of the key, the width of said notches being substantially the same as the thickness of the cap 12.

In operation the key enters the lock through the radial notches 40 in the cap 12 and when the step 34 engages the tumbler 22, said tumbler moves with the key toward the head 15 against the tension of the spring 23 (see Fig. 5), and so with the tumbler 21 when engaged by the step 35 (Fig. 6), and the tumbler 20 when engaged by the step 36 (Fig. 7), until the notch 37 is in register with the cap 12, at which time the tumblers 20, 21 and 22 are in register with the notches 28, 29 and 30 respectively in the feather 27. The key is now rotated and with it the locking bolt and the hook 17 which enters the staple 9, as shown in Fig. 2, the peripheral recess 41 in the head 15 which engages the feather 27 limiting this movement. This lock cannot be operated in any position wherein the tumblers will drop by gravity, which materially prevents tampering or the unlawful opening of the lock. This will be more readily understood if the sheet of the drawings having Figs. 5, 6 and 7 thereon is turned so that the views are vertical, with the cap 12 on top, instead of horizontal. When the key is inserted in the lock the tumbler 22 will be held against the end thereof by the spring 23 and the tumblers 20 and 21 will drop by gravity so that they will rest one upon the other and the locking bolt cannot be actuated as the tumblers cannot be brought into register with the notches in the feather 27.

The number of changes of tumbler and key combinations is endless, it being apparent that the positions of each variation of the notches in the feather will require a different key.

There are minor changes and alterations that can be made within my invention, aside from those herein suggested, and I would therefore have it understood that I do not limit myself to the exact construction herein shown and described, but claim all that falls fairly within the spirit and scope of my invention.

Having described my invention, what I claim as new and desire to secure by Letters Patent, is,—

1. In a lock, the combination with the case; of a locking bolt therein; tumblers movable thereon; a fixed part having notches therein; and means for moving said tumblers so that they will be brought into register with the notches in said fixed part.

2. In a lock, the combination with a case having notches therein; of a locking bolt; tumblers movable thereon; and key means for bringing said tumblers into register with said notches.

3. In a lock, the combination with a case; of a rotary locking bolt; a plurality of tumblers contacting with each other before being engaged by the shifting means; means for holding the same against rotation; and means for successively shifting said tumblers to predetermined positions for rotation.

4. In a lock, the combination with a case; of a locking bolt having a locking hook thereon; a plurality of tumblers having no spring connection therebetween movable toward and away from said hook; a spring between said hook and one of said tumblers; and key means for successively moving said tumblers in the direction of the axis thereof and rotating the same synchronously when the same are in a predetermined position.

5. In a lock, the combination with a case having a chamber therethrough; a bolt therein closing one end of said chamber; a cap within the other end of said chamber; and separable means for permanently securing said cap to said case.

6. In a lock, the combination with a lock case having a chamber therethrough; a bolt therein; a cap closing one end of said chamber; tumblers movable within said chamber coincident with the axis thereof; means for holding said tumblers against rotation until they are in certain predetermined relative positions; and means for permanently securing said cap to said case.

7. In a lock, the combination with a lock case having a chamber therethrough with a slot therein; of a bolt within said chamber having a locking hook thereon movable across said slot; tumblers within said chamber and operatively connected with said bolt; and key means for moving said tumblers and bolt.

8. In a lock, the combination with a case; of a locking bolt therein; and a plurality of tumblers slidable upon said bolt, each of said tumblers having diametrical slots therein progressively varying in length from the tumbler at one end of the series to the tumbler at the other end thereof.

9. In a lock, the combination with a case; of a headed locking bolt therein; and a plurality of tumblers slidable upon said bolt, each of said tumblers having diametrical slots therein progressively shorter in length toward the head of said bolt.

In testimony whereof I affix my signature in presence of two witnesses.

PETER S. DUNN.

Witnesses:
GEORGE E. HALL,
FLORENCE H. MONK.